Figure 1:
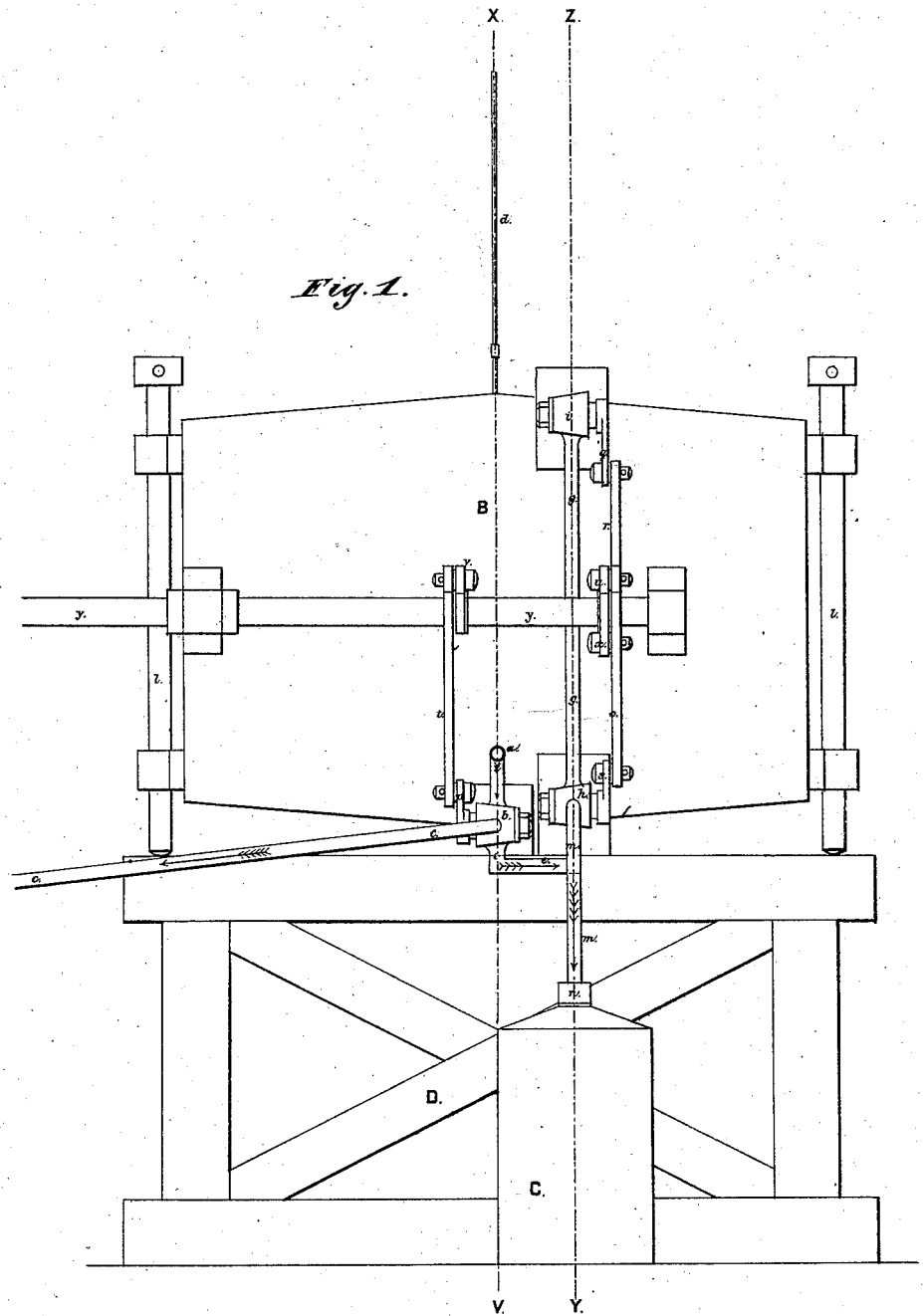

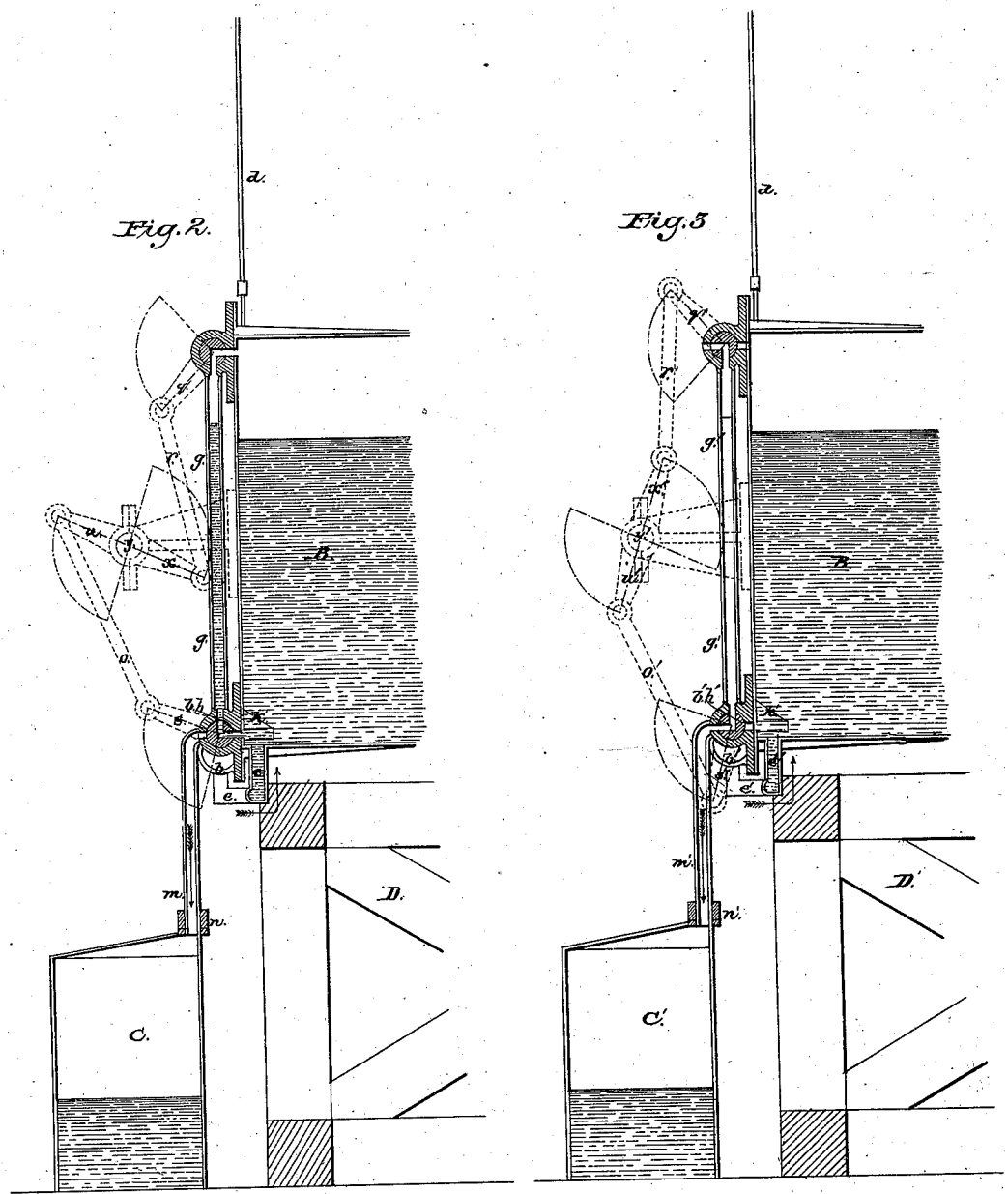

3 Sheets—Sheet 3.
C. R. WEDELIN.
MEASURING AND REGISTERING DEVICE FOR ASCERTAINING THE QUANTITY AND QUALITY OF DISTILLED LIQUIDS.
No. 194,630. Patented Aug. 28, 1877.
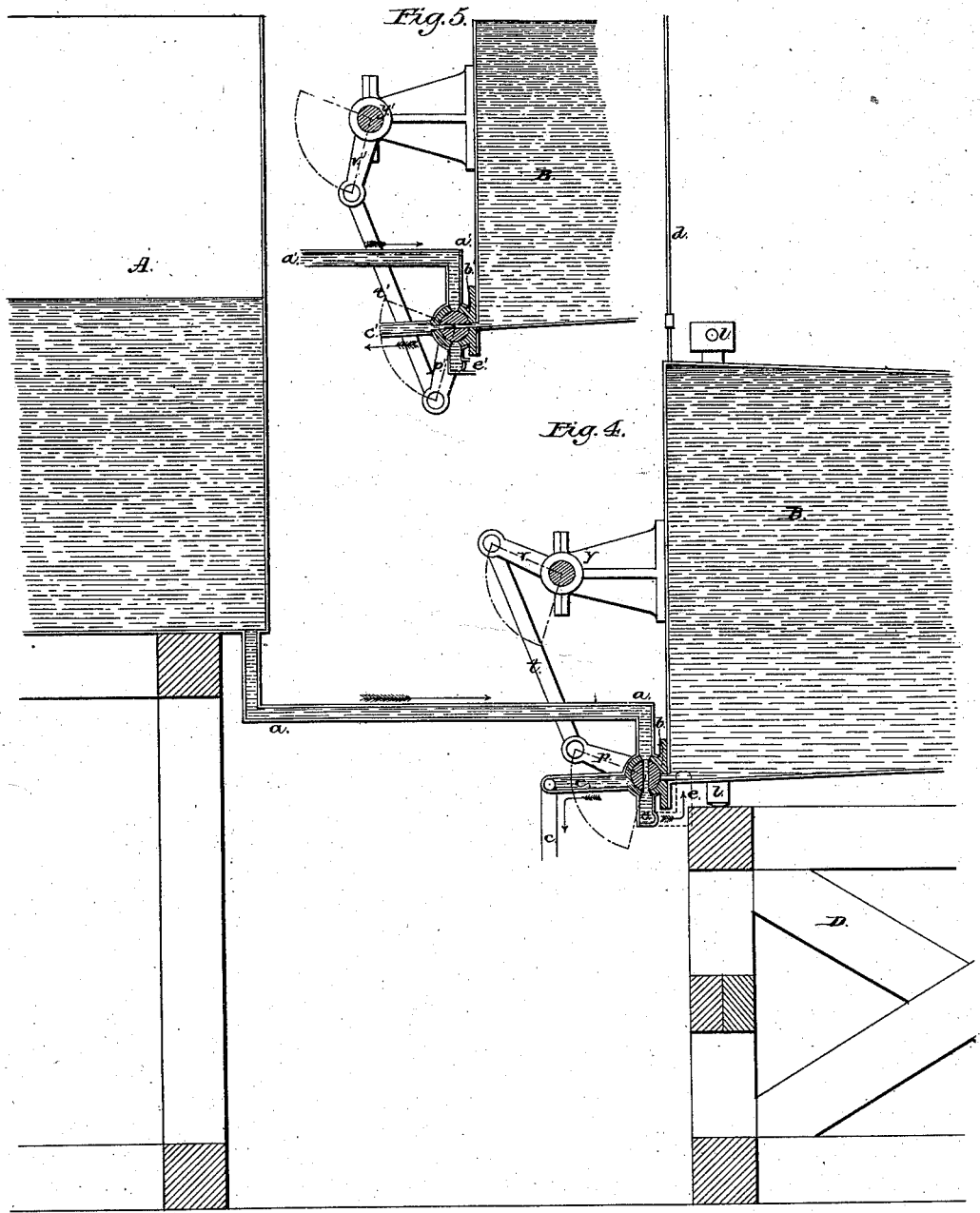

UNITED STATES PATENT OFFICE.

CARL ROBERT WEDELIN, OF GÖTHEBORG, SWEDEN.

IMPROVEMENT IN MEASURING AND REGISTERING DEVICES FOR ASCERTAINING THE QUANTITY AND QUALITY OF DISTILLED LIQUIDS.

Specification forming part of Letters Patent No. 194,630, dated August 28, 1877; application filed May 31, 1877.

*To all whom it may concern:*

Be it known that I, CARL ROBERT WEDELIN, of the city of Götheborg, in the Kingdom of Sweden, have invented a new and Improved Measuring and Registering Device; and I do hereby declare that the following is a full, clear, and exact description of the same.

My invention has for its object to produce a simple and efficient means for ascertaining the quantity and quality of distilled liquids, thereby facilitating the work of inspection, and enabling a reduction in number of the inspectors.

The invention consists in the combination, with the still, receiver, or vessel in which the liquid, on being distilled, is collected, of a larger measuring-tank and a smaller testing-reservoir, so constructed and connected together by pipes and valve mechanism that the filling of the measuring-tank from the receiver will set apart a small quantity for testing the grade or quality of the liquid, which small quantity, on emptying the measuring-tank, will be discharged into the testing-reservoir—a register connected with the valve mechanism at the same time indicating the number of times the measuring-tank has been filled and emptied, and thereby the quantity of liquid distilled, as will be hereinafter described with reference to the accompanying drawings, in which—

Figure 1, Sheet 1, represents a front view of the present apparatus. Figs. 2 and 3, Sheet 2, are vertical sections, taken through the line $y\,z$ of Fig. 1, showing the valve-gear in its two respective positions, viz., of filling the measuring-tank and of emptying the same and discharging a portion into the testing-reservoir. Figs. 4 and 5, Sheet 3, are vertical sections taken through the line $v\,x$ of Fig. 1, showing the respective positions of the supply-valve in filling and emptying the measuring-tank.

Similar letters of reference indicate same parts in the different figures.

A is the above-mentioned receiver. B and C are the measuring-tank and the testing-reservoir respectively. The tank B is filled from the receiver A through the pipe $a$, valve $b$, and pipe $e$, (see Sheet 3,) and emptied through the same valve $b$ and the pipe $c$, which latter exists through the wall of the locked room in which the apparatus is placed, leading the measured liquid to a tank or reservoir outside. The tanks B and C are closed, and the former provided with a narrow glass tube, $d$, through which air enters when emptying, and escapes when filling, tank B. The fact of the tank B being full can be ascertained by observing the height of the column of liquid in the tube $d$, which will then be on a level with the surface in the receiver A. (See Sheet 3.) $g$ is a vertical metallic pipe connected at both ends with the tank B, and provided at each end with a valve, $h\,i$. Above the lower inlet is placed a shield, $k$, underneath which also enters the supply-pipe $e$ from the receiver, so that the liquid on entering is first forced up against said shield $k$.

The tank B is supported on a frame, D, by set-screws $l$, by which its position may be adjusted to any exactness of level required. In order to facilitate filling and emptying, the bottom of the tank B is inclined toward the supply and discharge valve $b$ and the cover toward the air-tube $d$.

The testing-reservoir or smaller tank C is placed directly on the floor, and is connected to the valve $h$ and pipe $g$ by the vertical pipe $m$, to which latter it is attached by the screw-coupling $n$.

The valves $h\,h\,i$ are provided with the respective arms or cranks, $s\,p\,q$, which latter are connected, by the links or rods $o\,t\,r$, to corresponding arms $u\,v\,x$, attached on the shaft $y$, (see Sheet 1,) so that the turning of the shaft $y$ will operate the three valves simultaneously.

In filling the tank B the supply-valve $b$ is turned in the position shown in Fig. 4, Sheet 3, and the valves $h$ and $i$, as shown in Fig. 2, Sheet 2, whereby the tank B and pipe $g$ are both filled at the same time. But as the entering distilled liquid varies in strength and consequent specific gravity, the stronger, being lighter, will rise faster, and, deflecting against the shield $k$, fill the pipe $g$ in advance of the tank B, until, on reaching the upper connection, (at the valve $i$,) the contents of the pipe $g$ and tank B will flow together and attain exactly the same grade of strength, as has been proven by numerous experiments.

When the liquid has risen into the glass tube $d$, thus indicating that the tank B is full, the shaft $y$ is turned so as to change the position of the valve $b$ to that shown by $b'$ in Fig. 5, Sheet 3, and of the valves $h\ i$ to the positions $h'\ i'$, Fig. 3, Sheet 2, whereby the liquid contained in the pipe $g$ (or $g'$, Fig. 3) will flow through the valve $h'$ and pipe $m'$ into the reservoir C', where a sample of each filling is thus collected and kept for future test at inspection of the medium grade of the whole quantity distilled since previous inspection, while, at the same time, the liquid in the tank B flows out through the valve $b'$ and pipe $c'$, Fig. 5, and is collected in a vessel outside of the locked room in which the apparatus is placed.

The tank B being emptied, the shaft $y$ is turned so as to cause the valves to resume the positions shown in Figs. 2 and 4, when the liquid will again flow from the receiver A, and refill the tank B, again to be emptied by reversing the valves, as in Figs. 3 and 5. One end of the shaft $y$ goes through the wall of the room where the apparatus is placed, and is provided with a crank or arm for turning the said shaft and operating the valves.

A pane of glass is inserted in a hole made in the wall, through which may be observed, by the height of the column of liquid in the glass tube $d$, when the tank B is full. The direction of the flow is indicated by the arrows on the drawings.

The throw of the valves, indicated by the dotted-circle arcs, is regulated by stops in the ordinary manner. The size of the tank B is varied according to how often it is desirable to discharge the distilled liquid, according to the capacity of the still. The given capacity in gallons of the measuring-tank B multiplied by the number of times the same has been filled and emptied, determines the quantity of liquid distilled. The said number is indicated in figures on an ordinary register operated by a pawl or other device on the shaft $y$ in such a manner as to move the index forward one unit for each forward turn of the said shaft.

The quality or grade of the liquid is ascertained by testing the contents of the sample-reservoir C.

To prevent tampering with or accidental turning of the shaft $y$, the crank for operating the same should be boxed in and locked up until required to be handled by the person in charge.

By this invention the management of the measuring apparatus can be left to the owner of still without incurring any risk of fraud, as he is forced to fill and empty the tank B by turning the shaft $y$ and operating the index before he can collect and dispose of the product of his still.

By the application of this invention the now frequent attention of inspectors is rendered no longer necessary; but one traveling inspector may be able to alone discharge the duties now imposed upon a number of local officers.

Having thus described my invention, what I claim as new is—

1. In combination with the supply-tank A, the measuring-tank B, the pipes $a\ e\ c$, the valve $b$, (operated from the shaft $y$ by the arms $p\ v$ and link $t$, or their equivalents,) and the index for regulating and registering the filling and emptying of the tank B, substantially as and for the purpose specified.

2. In combination with the measuring-tank B, the pipe $g$, provided with the valves $i$ and $h$, (both operated from the shaft $y$ simultaneously with the valve $b$,) the pipe $m$, and sample-reservoir C, for filling the pipe $g$ at the same time with the tank B, and discharging its contents into the tank C while emptying the tank B, substantially as and for the purpose specified.

CARL ROBERT WEDELIN.

Witnesess:
L. A. GROTH,
EMIL WIDBERG.